United States Patent [19]

Li et al.

[11] 4,098,736
[45] Jul. 4, 1978

[54] LIQUID MEMBRANE ENCAPSULATED REACTIVE PRODUCTS

[75] Inventors: Norman N. Li, Edison; Adam L. Shrier, Montclair, both of N.J.

[73] Assignee: Exxon Research & Engineering Co., Linden, N.J.

[21] Appl. No.: 271,398

[22] Filed: Jul. 13, 1972

[51] Int. Cl.$^2$ .............................................. C08L 91/00
[52] U.S. Cl. ...................... 260/18 PN; 8/79; 252/188.3 R; 252/309; 252/316; 260/29.2 EP; 260/29.2 TN
[58] Field of Search ................ 252/316, 188.3 R, 309; 260/18 PN, 29.2 EP, 29.2 TN

[56] References Cited

U.S. PATENT DOCUMENTS

| | | | |
|---|---|---|---|
| 2,811,495 | 10/1957 | Wittcoff et al. | 260/29.2 EP X |
| 2,899,397 | 8/1959 | Aelony et al. | 260/29.2 EP X |
| 3,384,680 | 5/1968 | Lussow | 252/316 X |
| 3,432,327 | 3/1969 | Kan et al. | 252/316 X |
| 3,539,465 | 11/1970 | Hiestand et al. | 252/316 |
| 3,702,302 | 11/1972 | Wilson | 252/316 X |

*Primary Examiner*—Richard D. Lovering
*Attorney, Agent, or Firm*—Robert J. Baran

[57] ABSTRACT

A process for preparing reactive products which comprise two or more relative components is described. Said process comprises emulsifying at least one reactant in a first liquid which is substantially impermeable to all of the reactants, forming droplets of said emulsion, and suspending said droplets in a second liquid which is immiscible with said first liquid and which forms an immiscible continuous liquid phase, which comprises the remaining reactants. Preferably, the emulsion and the continuous liquid phase density are adjusted to be substantially equal so that a nonsettling product is obtained. In a most preferred embodiment, the reactive product comprises a two-component adhesive system, i.e., an epoxy resin and an amine hardener, said epoxy resin and amine hardener are maintained separate from each other by the exterior phase of an emulsion, the interior phase comprising the hardener, and the continuous phase, wherein said emulsion is suspended, comprising the epoxy resin. The adhesive product is applied to the objects, which are joined, by processes known in the art, i.e., spraying, dipcoating, etc., and the emulsion broken by heat and/or pressure, whereby the epoxy and the hardener mixes and forms a reaction product consisting of a copolymer of the epoxy resin and the amine hardener.

23 Claims, No Drawings

LIQUID MEMBRANE ENCAPSULATED REACTIVE PRODUCTS

FIELD OF THE INVENTION

A process for preparing reactive products which comprise two or more reactive components is described. Said process comprises emulsifying at least one reactant in a first liquid which is substantially impermeable to all of the reactants, forming droplets of said emulsion, and suspending said droplets in a second liquid which is immiscible with said first liquid and which forms an immiscible continuous liquid phase, which comprises the remaining reactants. Preferably, the emulsion and the continuous liquid phase density are adjusted to be substantially equal so that a nonsettling product is obtained. In a most preferred embodiment, the reactive product comprises a two-component adhesive system, i.e., an epoxy resin and an amine hardener, said epoxy resin and amine hardener being maintained separate from each other by the exterior phase of an emulsion, the interior phase comprising the hardener, and the continuous phase, wherein said emulsion is suspended, comprising the epoxy resin. The adhesive product is applied to the objects, which are to be joined, by processes known in the art, i.e., spraying, dipcoating, etc., and the emulsion broken by heat and/or pressure, whereby the epoxy and the hardener mixes and forms a reaction product consisting of a copolymer of the epoxy resin and the amine hardener.

BACKGROUND OF THE PRIOR ART

It is known in the art that there are many applications wherein two reactive components must be mixed just prior to using. For example, the well-known epoxy adhesives are two-component systems, consisting of an epoxy resin and an amine hardener which are mixed and then utilized to bond various substances, such as wood, metal, etc. It would be desirable to be able to apply this adhesive without going through the step of mixing, since mixing wastes, consumes time and labor and is subject to various human errors. At present there is no one-package epoxy adhesive system which has achieved commercial utility and which is suitable for the consumer market.

It is known in the art to encapsulate reactants in micro-capsules having solid walls. For example, carbon-less paper, as developed by The National Cash Register Co., utilizes microencapsulated dyes, which are coated on the paper, and subsequently ruptured by the pressure of a typewritter key. See *Chemical Engineering*, December 4, 1967, pp. 171–178.

Other examples of solid encapsulated systems, include (1) solvent reactivated adhesives, wherein neoprene is mixed with encapsulated toluene and the adhesive action is developed by rupturing the capsules and allowing the toluene to mix with the neoprene; and (2) encapsulated flavors and fragrances wherein the flavor or fragrance is released by rupture of the capsules.

In the past, emulsions have been used in separation processes to encapsulate reactants. In this process an emulsion comprising an interior and surfactant-containing exterior phase is contacted with a feed stream which is immiscible with said exterior phase. The components of the feed stream permeate through said exterior phase to the interior phase of the emulsion, wherein a reactant is maintained that will react with the permeable components converting them to a nonpermeable form and thus maintaining a concentration gradient across the exterior phase. See, for example, U.S. Pat. No. 3,617,546 and copending application 174,990, filed Aug. 25, 1971, now U.S. Pat. No. 3,779,907. In these processes, the emulsions utilized, unlike the emulsions utilized in forming the reactive products of the instant invention, are preferably formulated to be of sufficiently different density, than the continuous phase (feedstream), so as to separate easily from the feed-stream when agitation is ceased. Also, the exterior phase is selected to allow an efficient rate of permeation of feestream components, while the exterior phase of the emulsions utilized in the preparation of the instant reactive products, must be substantially impermeable.

DESCRIPTION OF THE INVENTION

It has now been unexpectedly discovered that reactive systems containing two or more reactive components are conveniently prepared by emulsifying one or more reactants in a first liquid which is substantially impermeable to all of the reactants in the system, and then suspending droplets of said emulsion in a second liquid, which is immiscible with said first liquid, and which forms an immiscible continuous phase, wherein the remaining reactants are contained. Preferably, the density of the emulsion and the continuous phase are substantially equivalent, and thus nonsettling, one-package systems are produced, whereby the reactive components are present in one package and yet maintained separate for later use by breaking said emulsion and allowing the reactants to mix and form reaction products. In effect, liquid encapsulated reactive systems are prepared which may be used in many of the same areas that solid encapsulated systems are used, and have the following advantages over the aforementioned solid encapsulated systems, i.e., microcapsules.

Ease of Preparation — Emulsification of reactants is generally less complex than forming solid capsules around them.

Ease of Application — Spraying of liquid systems, in general, is simpler than spraying solid capsules.

Removal of inert matter — The first liquid, described above, may choose so as to evaporate after using, thus eliminating the problem encountered with solid microcapsules, i.e., presence of solid particles.

Conveniently, the above reactive systems are prepared by emulsifying a reactive component in a first liquid which is substantially impermeable to the reactants of the desired system, and also immiscible with the second liquid utilized to dissolve the remaining reactants. The emulsions are prepared by techniques known in the art; for example, a first reactant either dissolved in a suitable solvent or neat, is slowly added to said first liquid which preferably contains a surfactant, while said first liquid is being subjected to conditions of shear. The first liquid and the emulsification conditions are selected so that the first liquid forms the exterior phase of the emulsion. Adequate shear is applied to the system to ensure a stable emulsion. The emulsion is then carefully mixed with the remaining reactants either in solution or if said remaining reactants are liquid, neat. Careful mixing is required so that the emulsion, which is designed to have an exterior phase which is immiscible with the remaining reactants, will form droplets that are suspended in a continuous liquid.

Preferably, to achieve optimum stability of said system, i.e., to prevent the droplets of said emulsion from coalescing and settling to the top of the bottom of said continuous liquid, the density of both the continuous liquid and the emulsion is adjusted to be substantially equivalent.

This concept is a general one and may be applied to making new compositions of matter wherein coreactants, known in the art, may be isolated by a liquid barrier and placed in one package for convenient sale and use. In general, all reactive systems known in the art are within the scope of the instant invention. For example, epoxy-hardener adhesive systems; monomer-catalyst systems; systems wherein monomer, catalyst and inhibitor are isolated from contact with a scavenger for said inhibitor, etc. can all be made into one-package systems by the technique of the instant invention. Specific reactive systems comprising two or more reactive components include:

Polyurethanes, wherein the isocyanate is separated from its coreactant, e.g. amine or hydroxy terminated prepolymers; polysulfides, wherein the curing agent e.g. lead dioxide is encapsulated separate from the polymer; etc.

Each of these systems is prepared by first emulsifying one reactive component in a first liquid. Said first liquid, forms the exterior phase of the resulting emulsion, and as stated before, is chosen so that the reactive components of the system are substantially impermeable, i.e., the reactants are nonsoluble and thus will not diffuse from the interior phase of the emulsion into the continuous phase (second liquid), wherein the emulsion droplets are suspended, and vice versa. Further, said first liquid must form stable emulsions with said first reactive component. The first reactive component, is emulsified either by itself, i.e., neat, if it is a liquid, or dissolved in a suitable solvent. Preferably, the first liquid contains a surfactant which stabilizes the emulsion formed. In general from 0.01% to 10% by weight, surfactant will be present in the exterior phase, more preferably from 0.1% to 5%.

The surfactant is chosen with a view toward forming stable emulsions. The surfactants which may be used within the scope of the instant invention are chosen according to criteria which will be known to the skilled artisan in emulsion technology. For example, to form stable emulsions of the instant invention, the HLB method may be conveniently utilized. In this method, an HLB number is assigned to each surface-active agent, and is relayed by a scale to the suitable applications. Only those materials with HLB numbers in the range of 4 to 6 are suitable as emulsifiers for W/O emulsions, while only those with HLB numbers in the range of 8 to 18 are suitable for the preparation O/W emulsions. Agents with HLB numbers in different ranges, while possessing important surface-active properties, cannot, according to this classification, be employed as emulsifying agents. For more detail information in HLB method, one is referred to "Emulsions: Theory and Practice" by Paul Becker, published by Reinhold Publishing Corporation in New York. The surfactants are further chosen so that they do not increase the permeability of any of the reactive components of the system, and further, preferably, do not substantially lower interfacial tension at the exterior phase-continuous phase interface.

Surfactants which may be utilized within the scope of the instant invention include all the commonly available surfactants, i.e. those of anionic type, cationic type, nonionic type and ampholytic type. It should be mentioned that the synthetic surfactants as well as naturally-occurring surfactants can be used. In addition, some finely-divided solids may also be used to create the desirable emulsion. This is well-known in the art of making emulsion. For detailed chemistry of emulsifying agents, one is referred to the Becher book, infra.

Preferred surfactants include carboxylic acids e.g. $C_{12}$-$C_{20}$ fatty acids and their corresponding soaps, rosin and tall oil acids, and paraffin oxidation products; sulfuric esters, including the sulfated derivatives of alcohols and olefins having from 10 to 20 carbon atoms; alkylaryl sulfonates, e.g. dodecylbenzene sulfonates, etc.; amines, including quaternary amine salts, e.g. $C_{12}$-$C_{18}$ normal primary aliphatic amines including their acrylonitrile adducts; imidazoline derivatives (condensation products of fatty acids and ethylenediamine and its derivatives); ethylene and propylene oxide derivatives, e.g. block copolymers of ethylene oxide and propylene oxide, nonyl and octyl phenol derivatives of ethylene oxide having from 1 to 50 ethylene oxide units per phenol molecule, polyethoxy derivatives of alcohols and mercaptans, polyethenoxy esters, such dimerized linoleic acid-polyethylene glycol reaction products; the reaction products of fatty acids and polyols, e.g. pentaerythritol, glycerol, and the glucosides of $C_{12}$ to $C_{25}$ fatty acids; etc.

In another embodiment of the instant invention, two or more reactants are separately emulsified in comiscible liquids which are substantially impermeable to said reactants. This embodiment is not preferred because of the requirement of substantially greater amounts of said impermeable phase. One or more comiscible liquids may be used to form the separate emulsions, however the mixture of all comiscible liquids must be substantially impermeable to said reactants.

The emulsion once formed is slowly added to a second liquid (continuous phase) which is immiscible with the exterior emulsion phase. For example, when the exterior phase of the emulsion is aqueous, the continuous phase may conveniently be a hydrocarbon. The continuous phase may consist of the remaining reactants of the system if they are liquid. The remaining reactants may also be dissolved in a suitable solvent which comprises the continuous phase. Care must be taken in adding the emulsion to said continuous phase, since the continuous phase is usually miscible with the interior phase of the emulsion, and if violent agitation is applied to the system, inversion may occur. This will result in the interior phase and the continuous phase mixing, and the systems reacting prior to use. The exterior phase of the emulsion, however, may be, by adjustment of viscosity and interfacial tension between the exterior phase and the continuous phase, substantially strong enough to resist invention. Ideally, the density of the continuous phase and the emulsion is held substantially equivalent so that the emulsion droplets once formed will not settle. Some settling is, however, not necessarily detrimental so long as the exterior phase retains its function as a barrier between the two reactive components. Preferably, the droplets are uniformly dispersed throughout the continuous phase; thus when applying the novel one-package systems of the instant invention, correct ratios of reactants will be applied whether or not the one-package system is stirred prior to use or not. Once again, slight stirring before using said systems is not necessarily undesirable so long as the shear needed to redisperse the emulsion into droplets is not enough to cause substantial breakup of the emulsion and concomitant mixing of the reactive components.

The one-package systems which are within the scope of the instant invention are applied from the single container by techniques which will be obvious to the skilled artisan. More specifically, the above-described epoxyamine hardener system may be applied by techniques known in the art of adhesive technology, such as brushing, spraying, dipcoating, etc. the surface to be bound. The surfaces will then be joined, and at this point, either by pressure and/or heat, the emulsion will be broken, allowing the interior phase of the emulsion to mix with the continuous phase, whereby said reactive components form a reaction product. If it is desirable, heat and/or pressure can be applied at this point to further promote the reaction. It is thus obvious by the intended use of said one-package systems, that it is preferable that the emulsion formed be of a nature such that it will break when applied under chosen environmental conditions of heat, pressure, etc. In general, this is obtained by maintaining the surfactant concentration and the viscosity of the exterior phase at a level whereby the emulsion is unstable to either heat or pressure, or both.

The following are specific embodiments of the instant invention.

EXAMPLE 1

Controlled Release Dye

In this experiment a two component dye which formed a color when the two components were reacted, was utilized to demonstrate the liquid membrane encapsulated reactive products which may be prepared.

125 gms. of a 15% by weight potassium ferrocyanide solution were encapsulated by emulsification in 250 gms. of hydrocarbon solution containing 2% by weight Span 80, (sorbitan monooleate), 4% by weight, of a polyamine derivative (a) and the remainder Solvent 600 Neutral, an isoparaffin solvent, available from Enjay Chemical Co.

150 gms. of this emulsion was mixed at 190 RPM with 450 gms. of an aqueous solution containing 0.011% by weight $FeCl_3$ for 4.5 hours. No color was observed during the mixing. When the mixing intensity was increased to 750 RPM, within 10 minutes the typical Prussian Blue color appeared.

A separate 25 gms. of the above emulsion was mixed with 30 gms of the 0.11% $FeCl_3$. After standing with occasional mixing for two weeks no color had developed.

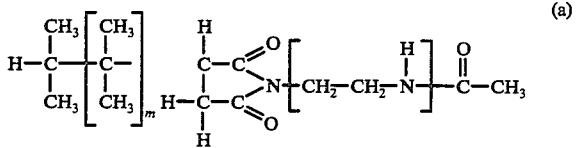

(a)

wherein $m$ is an integer of about 40, giving said polyamine derivative a molecular weight of about 2000.

EXAMPLE 2

Two Component Adhesive System 5 gms of Epon V-40 (Shell Chemical Co.), a resin curing agent which is a condensation product of a polyamine with a dibasic acid (polymerization product of unsaturated fatty acids), was dissolved in 15 gms. of water and the resulting solution emulsified in 60 gms. of hydrocarbon solution consisting of 2% by weight sorbitan monooleate, 3% by weight of the polyamine derivative of Example 1, and the remainder Solvent 100 Neutral a low viscosity of isoparaffin solvent, available from Enjay Chemical Co. 40 grams of the above emulsion was then mixed with Epon-815 (Shell Chemical Co.), a bisphenol-A expoxy resin, modified with a mono-epoxy diluent to provide low viscosity. This mixture remained fluid for 4 days at room temperature.

As a comparison, 5 gms. of Epon V-40 and 5 gms. of Epon 815 were mixed directly. This mixture hardened within 3 hours.

As further check to determine wheter 'dilution' effects were the cause of the fluidity of initial epoxyamine hardener experiment over a 4 day period, the same proportions of Epon V-40, Epon 815, water, sorbitan monooleate, polyamine derivative and isoparaffin solvent were mixed together, without first encapsulating the Epon V-40 by emulsification in the hydrocarbon solution. This mix hardened within 1 day at room temperature.

In another experiment, 5 gms, of Epon V-40 was dissolved in 15 gms of water, and the solution emulsified with 50 gms of a solution containing 2% by weight sorbitan monooleate and 98% by weight of the polyamine derivative of Example 1. This emulsion was mixed with 5 gms of Epon 815 and the mixture was fluid after 3 days at room temperature. The mixture was then applied to the surfaces of two pieces of wood. The surfaces were passed together to break the emulsion and allow the Epon 815 and Epon V-40 to mix and react. After 24 hours at room temperature a strong adhesive bond between the two pieces of wood had formed.

What is claimed is:

1. A composition of matter, comprising droplets of an emulsion suspended in a continuous liquid phase, said continuous phase comprising at least one reactant, and said emulsion comprising an interior phase, said interior phase comprising a coreactant, which is capable of reacting with said reactant upon the breaking of the emulsion, and an exterior phase, said exterior phase being immiscible with said continuous liquid phase, an said exterior phase being impermeable to said reactant and coreactant.

2. The composition of claim 1, wherein said emulsion comprises a surfactant.

3. The composition of claim 2, wherein said emulsion and said continuous liquid phase are of substantially equivalent density.

4. The composition of claim 2, wherein said reactant comprises an amine hardener, said coreactant comprises an epoxy resin.

5. The composition of claim 4, wherein said surfactant is sorbitan monooleate.

6. The composition of claim 2 wherein said reactant is a polyfunctional isocyanate and said coreactant is selected from the group consisting of amine and hydroxy terminated prepolymers.

7. The composition of claim 2 wherein said reactant is a polysulfide polymer and said coreactant is lead oxide.

8. A process for preparing a reactive product, said product comprising two or more reactants which are capable of coreaction, which comprises emulsifying at least one reactant in a first liquid which is impermeable to said reactants, forming droplets of said emulsion, and suspending said droplets in a second liquid which is immiscible with said first liquid and which firms an immiscible liquid continuous phase, said continuous liquid phase comprising the remaining reactants.

9. The process of claim 8 wherein said first liquid comprises a surfactant.

10. The process of claim 8 wherein said reactive product comprises two reactants.

11. The process of claim 10 wherein one reactant comprises an amine hardener and the other reactant comprises an epoxy resin.

12. The process of claim 11 wherein said surfactant comprises a sorbitan monooleate.

13. The process of claim 10 wherein one reactant is a polyfunctional isocyanate and the other reactant is selected from the group consisting of amine and hydroxy terminated prepolymers.

14. The process of claim 10 wherein one reactant is a polysulfide polymer and the other reactant is lead oxide.

15. The process of claim 10 wherein said emulsion density and said continuous liquid density is adjusted to be substantially equivalent.

16. A process for applying a reactive product, said product comprising two or more reactants which are capable of coreaction, one of said reactants being emulsified in a first liquid which is impermeable to said reactants, and said emulsion being suspended as droplets in a second liquid which is immiscible with said first liquid and which forms an immiscible continuous liquid phase, said continuous liquid phase comprising the remaining reactants, said process comprising breaking said emulsion and mixing said reactants at reaction conditions, whereby a reaction product is formed.

17. The process of claim 16, wherein said first liquid comprises a surfactant.

18. The process of claim 17 wherein said reactive product comprises two reactants.

19. The process of claim 18 wherein one reactant comprises an amine hardener and the other reactant comprises an epoxy resin.

20. The process of claim 18 wherein said surfactant comprises a sorbitan monooleate.

21. The process of claim 18 wherein one reactant is a polyfunctional isocyanate and the other reactant is selected from the group consisting of amine and hydroxy terminated prepolymers.

22. The process of claim 18 wherein one reactant is a polysulfide polymer and the other reactant is lead oxide.

23. The process of claim 18 wherein said emulsion density and said continuous liquid density is adjusted to be substantially equivalent.

* * * * *